United States Patent
Doyen et al.

(10) Patent No.: US 11,145,469 B2
(45) Date of Patent: Oct. 12, 2021

(54) PROCESS FOR PRODUCING A POROUS CARBON ELECTRODE

(71) Applicant: VITO NV, Mol (BE)

(72) Inventors: Willy Doyen, Mol (BE); Dennis Cardoen, Mol (BE); Joost Helsen, Mol (BE); Andre-Viktor Claes, Mol (BE)

(73) Assignee: VITO NV, Mol (BE)

( * ) Notice: Subject to any disclaimer, the term of this patent is extended or adjusted under 35 U.S.C. 154(b) by 52 days.

(21) Appl. No.: 16/473,980

(22) PCT Filed: Dec. 27, 2017

(86) PCT No.: PCT/EP2017/084651
§ 371 (c)(1),
(2) Date: Jun. 26, 2019

(87) PCT Pub. No.: WO2018/122268
PCT Pub. Date: Jul. 5, 2018

(65) Prior Publication Data
US 2019/0326067 A1    Oct. 24, 2019

(30) Foreign Application Priority Data

Dec. 27, 2016   (EP) .................................... 16207007

(51) Int. Cl.
| | | |
|---|---|---|
| *H01M 4/13* | (2010.01) | |
| *H01G 11/26* | (2013.01) | |
| *C02F 1/469* | (2006.01) | |
| *H01G 11/38* | (2013.01) | |
| *H01G 11/68* | (2013.01) | |
| *C02F 1/461* | (2006.01) | |
| *C02F 103/08* | (2006.01) | |

(52) U.S. Cl.
CPC ............ *H01G 11/26* (2013.01); *C02F 1/4691* (2013.01); *H01G 11/38* (2013.01); *H01G 11/68* (2013.01); *C02F 2001/46138* (2013.01); *C02F 2001/46161* (2013.01); *C02F 2103/08* (2013.01)

(58) Field of Classification Search
CPC .... H01M 4/1393; H01M 4/139; H01M 4/133; H01M 4/0404; H01M 4/0409; H01M 4/0435; H01M 4/0471; H01M 4/0485; H01M 4/08; H01M 4/362; H01M 4/364; H01M 4/621; H01M 4/622; H01M 4/70; H01M 4/64; H01G 11/26; H01G 11/38; H01G 11/68; C02F 1/4691; C02F 2001/46138; C02F 2001/46161; C02F 2103/08
See application file for complete search history.

(56) References Cited

U.S. PATENT DOCUMENTS

| | | | |
|---|---|---|---|
| 2008/0297980 A1* | 12/2008 | Bourcier ............... | C02F 1/4691 361/502 |
| 2013/0101906 A1* | 4/2013 | Alvarez Gallego ........................ | H01M 4/8807 429/401 |
| 2015/0239756 A1* | 8/2015 | Jikihara ................ | C02F 1/4691 204/554 |
| 2016/0272515 A1 | 9/2016 | Choi et al. | |

FOREIGN PATENT DOCUMENTS

EP     2070875 A1    6/2009

* cited by examiner

*Primary Examiner* — Raymond Alejandro
(74) *Attorney, Agent, or Firm* — Knobbe, Martens, Olson & Bear, LLP

(57) ABSTRACT

A method for producing a porous carbon electrode includes preparing a slurry by mixing a porous, particulate, conductive carbon powder with a solution of a polymer binding agent for the particulate carbon powder in a solvent for the polymer binding agent, forming a precursor electrode by casting the slurry as a layer and subjecting the cast layer to a wet phase inversion to realize porosity in the cast layer, subjecting the thus obtained precursor electrode to a thermal treatment to cause oxidative stabilization, carbonization, dehydrogenation or cyclisation of the polymer binding agent or a combination of two or more of the afore mentioned phenomena by heating the precursor electrode and converting the polymer binding agent into a conductive binding agent binding the particles of the conductive carbon powder together.

23 Claims, 1 Drawing Sheet

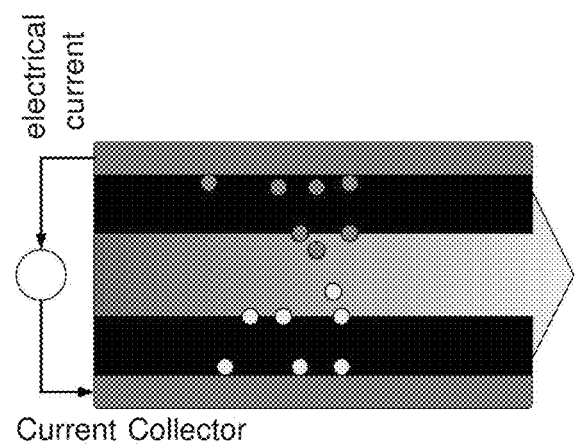

PROCESS FOR PRODUCING A POROUS CARBON ELECTRODE

BACKGROUND OF THE INVENTION

Field of the Invention

The present invention relates to a method for producing a porous carbon electrode according to the preamble of the first claim.

Description of the Related Art

The availability of processes to achieve an energy efficient, robust and low-cost desalination of salt containing waters has become a major societal challenge and its relevance is expected to continue to grow in the near future for several reasons. Currently, roughly 1% of the global population receives water sourced from water desalination, a number which is expected to increase to 14% by 2025. In addition, there is a high demand for efficient salt ion removal technologies for industrial process and waste streams. In particular, there is a high demand for technologies that can achieve selective ion removal.

Capacitive deionization (CDI) is an emerging deionization technology which uses capacitive porous electrodes to adsorb ions inside the electrical double layer at the system's interface between the electrode matrix and the aqueous solution. Capacitive deionization has several unique advantages compared to established desalination technologies, in particular it can be carried out at low pressure, at room temperature and it may be operated at low voltage. Capacitive deionization shows a high energy efficiency even at low to moderate salinity and provides the possibility to simultaneously save energy and desalinate salt streams.

Practical use of capacitive deionization is still limited due to relatively high CAPER costs, which is due to too low salt removal rates relative to the cell cost. New developments in relation to capacitive deionization focused mainly on increasing the adsorption capacity of the electrode and the rate with which salt may be adsorbed by the electrode. Previous approaches to the production of cost-effective capacitive deionization electrodes related to the incorporation of electrically conductive additives (e.g., carbon black) in the electrode material and the use of several binder materials in the electrode material, the binder materials being composed of ion exchange resin polymers or in general polymers containing ion exchanging functional groups.

When analysing the problems associated with the previous approaches to improve the performance of electrodes in capacitive deionisation, the inventors have observed that conductive additives incorporated into the electrode material do generally not contribute to binding the active material particles together. Hence they do not contribute to the structural strength of the electrode. Ion exchange resin based binders present the problem that they are electrically insulating and that the charge sign of their ionic charges cannot be changed during operation of the system. Hence, electrodes containing one single type of ion exchange resin binder are only beneficial to the desalination rate if they are polarized in one single direction. Such unipolar operation is however detrimental to the lifetime of capacitive deionization electrodes. Alternatively, an electrode could contain both an anionic and cationic binder resin. Given that the amount of binder that can be successfully incorporated in an electrode without compromising the electrode's electrical conductivity is limited, incorporation of both an anionic and cationic binder resulted in a rather limited benefit to the salt adsorption rate.

U.S. Pat. No. 5,636,437 discloses a process for fabricating solid porous carbon electrodes, according to which a high surface area carbon powder is mixed with a carbonizable phenolic resin or polyacrylonitrile polymer in furfuryl alcohol and pyrolized in an inert, oxidizing or reducing atmosphere at a temperature above 600° C. The pyrolysis treatment aims at transforming the polymer into a carbonized material, embedding the carbon powder particles therein and at altering the properties of the high surface area porous carbon powder in order to render it fit for use in particular electrochemical applications. Inert atmospheres generally produce low surface area materials, and the presence of reducing agents assists in removing surface oxygen-containing species present on the surface of the porous carbon powder. Oxidizing atmospheres result in an activation of the porous carbon powder and increase the surface area of the electrode. However, the presence of the alcohol decomposition products may be undesirable as they may block the porosity of the porous carbon to a major extent.

US2011163273 discloses a process for producing a composite carbon electrode, wherein a porous carbon matrix with the shape of the final electrode is infused with a carbonizable material, for example a phenolic resin. The resin is cured and carbonized, and an activated all-carbon electrode devoid of electrically insulating components is obtained. However, the strength of the electrode is limited by the porous matrix structure and the porosity of the carbon material imparted by curing of the resin is limited. Besides this, rather high temperatures are required to achieve carbonisation and the carbonizable materials used are expensive.

U.S. Pat. No. 5,776,633 discloses a process for increasing the active surface area of a carbon based electrode for use in electrochemical cells, by incorporating activated carbon into the electrode. The process comprises the steps of: (a) preparing a mixture of activated carbon powder, a phenolic resin binder and at least one activated carbon material selected from the group of activated carbon fibers and activated carbon fabric; (b) shaping the thus obtained slurry into an electrode and curing the resin; (c) carbonizing the resin in a non-oxidizing atmosphere at a temperature of between 600-1000° C. to convert the resin into an electrically conductive material and obtain an all-carbon electrode. A thus produced carbon based electrode shows a limited mechanical strength. Because of the absence of porosity in the resin the contact surface area between the activated carbon powder particles will be limited and the porosity of the porous carbon electrode is exclusively defined by the residual porosity of the carbon powder which remains after the thermal treatment.

The use of ion conductive binders and/or ion conductive additives in composite capacitive deionization electrodes has been described in US2016272515. Hydrophilic, water-soluble binders are chemically crosslinked. In order to introduce electric conductivity to the binders connecting the activated carbon-based material, the surface of the binders is modified with ion exchange groups, with the purpose of introducing a chemical charge to the binder surface. However, no additional porosity is created and the polarity of the surface charge of the ion exchange surface functional groups cannot be changed by adapting the polarity of the applied voltage.

US20080297980 discloses a method wherein an electrically conductive support it, infused with a carbonizable material, an adjacent carbon cover layer comprising carbon particles or precursor thereof is applied to the electrically conductive support, after which the carbonizable material is cured and the electrically conductive support and the carbon cover layer are carbonized to form the carbon electrode. However, curing creates only a limited number of contact points between the carbon cover layer and the electrically conductive support, and thereby limits the performance of the electrode. EP2070875 discloses a process for preparing an electrode for capacitive deionization of water comprising: (i) forming a composition of 60-88% by weight of activated carbon with a particle size range of 75-300 microns, 5-30% by weight of polytetrafluoroethylene thermoplastic polymeric binder with a particle size range of 20-60 microns and 2-30% by weight of conductive carbon black and including a fluid to said mixture: (ii) casting the composition obtained in step (i) in a mold, compressing the mold and, heating the mold to a temperature in the range 150° C. to 350° C. to cause the polymeric binder to melt. Melting of the polymeric binder however causes any porosity present in the binder to collapse and adversely affects the electrically conductive network connecting the conductive carbon black.

EP2548246 discloses a method for producing a gas diffusion electrode, with an electrically conductive carbon or graphite matrix, comprising hydrophobic and hydrophilic pores. The matrix further comprises a catalyst. The method comprises the steps of casing a porous electrically conductive web with a suspension of particles of the electrically conductive material in a solution of a first, binder to provide a first electrochemically active layer. On top of the first layer, a second layer is casted of a suspension of particles of a hydrophobic fluorinated polymer in a solution of a second binder. Then, the first, and second layer are subjected to phase inversion, so that a second water repellent layer is formed and porosity is realised in the first and second layer.

KR20100082977 discloses a composite electrode containing both polymer binders with charged functional groups and an electrically conductive additive such as carbon black. The former, apart from its conventional role of binding the active materials (e.g. activated carbon particles) presumably also serves to enhance the ionic conductivity of the electrode, possibly with the purpose of enhancing the electrical conductivity of the electrode. A thermal treatment is applied, although the purpose thereof is not explained. The composite electrode described in KR20100082977 presents the disadvantage that besides a binder material, also a conductive additive needs to be incorporated in the electrode material.

The prior art methods described above however all present the disadvantage that they provide electrodes with insufficient performance, in particular an insufficient ion adsorption capacity. There is therefore a need for a process with which capacitive deionization electrodes can be produced of an improved performance, in particular an improved ion adsorption capacity.

There is also a need for an uncomplicated, low cost process which permits to produce capacitive deionization electrodes suitable for use in large-scale industrial processes.

SUMMARY OF THE INVENTION

It is therefore an object of the present invention to provide an uncomplicated, low cost process with which carbon based electrodes suitable for use in capacitive deionization can be produced and which show both high ion adsorption rate and improved ion adsorption capacity, in particular carbon based electrodes which are suitable for use in large-scale industrial processes. More particularly, it is an object of the present invention to provide a process for the production of an all carbon electrode with an improved ion adsorption capacity for use in capacitive deionization.

This goal is achieved according to the present invention with a method showing the technical features of the characterising portion of the first claim, Thereto, the method for producing a porous carbon based electrode of this invention comprises the steps of preparing a slurry by mixing a porous, particulate, conductive carbon powder with a solution of a polymer binding agent for the particulate carbon powder, wherein the polymer binding agent is dissolved in a solvent for the polymer binding agent; forming a precursor electrode by casting the slurry as a layer and subjecting the cast layer to a phase inversion to realize porosity in the cast layer: subjecting the thus obtained precursor electrode to a thermal treatment by heating the precursor electrode to a temperature with the purpose of converting the polymer binding agent into a conductive binding agent binding the particles of the conductive carbon powder together, wherein the polymer binding agent is a polymer material having a degradation temperature which is lower than its melting temperature.

BRIEF DESCRIPTION OF THE DRAWINGS

The following description of the figures of specific embodiments of the present invention described herein is merely exemplary in nature and is not intended to limit the scope of the present invention regarding teachings, their application, uses, etc..

FIG. 1 shows that capacitive de-ionization uses pairs of oppositely placed porous carbon electrodes which store ions upon applying an electrical voltage difference.

DETAILED DESCRIPTION OF THE PREFERRED EMBODIMENT

The polymer binding agent used in the method of this invention is a polymer material which when subjected to a wet phase inversion as described in more detail here below, gives rise to the formation of a porous structure in the polymer material. The method of the present invention is therefore able to create porosity in the electrode, in addition to the porosity provided by the carbon powder.

The polymer binding agent is preferably a polymer material selected from the polymer materials capable of undergoing cyclisation, possibly accompanied by dehydrogenation. Another category of polymer materials suitable for use as a binding agent are those capable of undergoing oxidative stabilization, possibly accompanied by dehydrogenation. Particularly preferred polymer binding agents are those which may be capable of undergoing a combination of two or more of the afore-mentioned reactions, to give rise to the formation of a porous electrically conductive network. It shall be clear to the skilled person that a mixture of two or more polymer binding agents as described above may be used as well.

The inventors have observed that in a first stage of the method of this invention where the porous conductive carbon powder is mixed with the polymer binding agent, the ability of the polymer binding agent to function as a binding agent for the particles of the porous carbon powder is used to form a cohesive precursor for the composite electrode in the form of a cohesive slurry, which can be cast into a layer. In this cohesive precursor the polymer binding agent functions as a temporary binder which binds the conductive carbon particles together, with the purpose of providing a slurry of a sufficient cohesion, suitable of being applied in the form of a layer with some form stability to form a precursor electrode material.

The phase inversion step to which the polymer binding agent dissolved in a suitable solvent is subjected, ensures that porosity is induced in the polymer binding agent, while the polymer binding agent continues to function as a binding agent binding together the particles of the conductive carbon powder.

In a further stage of the method of this invention wherein the phase inverted layer of the precursor electrode is subjected to a thermal treatment, form stability of the can be maintained because the thermal treatment is carried out at a temperature which provides an optimal compromise between (1) on the one hand being sufficiently low, i.e. below the melting temperature of the polymer binding agent, so that the risk to melting of the binding agent may be reduced to a minimum and porosity of the binding agent and form stability of the cast layer may be maintained, and (2) on the other hand being sufficiently high so that the polymer binding agent may be converted into a porous, conductive material.

This conversion may involve oxidative stabilization, carbonization, cyclisation or dehydrogenation or a combination of two or more of these phenomena, depending on the nature and chemical composition of the polymer binding agent. The inventors have thus observed that after having been subjected to the thermal treatment, the polymer binding agent continues to function as a porous binding agent binding together the conductive carbon powder particles which form the active material of the electrode.

The polymer binding agent thus functions as a binding agent for the conductive carbon powder particles in all stages of the method of this invention, i.e. in the first stage when preparing the slurry precursor for the active electrode material, in the course of casting the electrode by application of a cohesive layer of the slurry containing the polymer binding agent and the conductive carbon powder, in the course of the phase inversion step, in the course of the thermal treatment stage and after the thermal treatment has been carried out and the final active material layer of the electrode is obtained, Surprisingly it has been observed that the residue of the polymer binding agent formed in situ in the electrode material, in the course of the phase inversion step shows a porosity that is desired for the intended application or use of the electrode. It has further been observed that this porosity may be maintained in the course of the thermal treatment. The inventors believe that the porous system formed in the polymer binding agent In the course of the thermal treatment gives access to and is connected the porous system of the conductive carbon powder. Therewith the porous system developed by and in the polymer binding agent is able to contribute to improving the ion adsorption capacity of the electrode and its performance in the desalination of salt containing waters.

The inventors have further surprisingly found that the thermal treatment causes conversion of the polymer binding agent into a material with ionic and electric conductivity. As a result, the porous conductive carbon powder particles which form the active material of the electrode are connected to each other by a residue remaining from the thermally treated polymer binding agent, which is porous, ionically and electrically conductive. Moreover, this electrically conductive support is capable of connecting the carbon powder particles to the other electrically conductive parts of the electrode, for example the current density distributor or current collector functioning as a carrier the active electrode material.

In particular, the thermal treatment has the effect that the polymer binding agent is converted into a residue with a high content of carbon or carbonlike compounds, which may correspond to 50 to 95 wt. % of the original weight of the polymer binder.

The polymer binding agent used in the method of this invention, after thermal post-treatment of the casted precursor for the electrode, thus combines several functions: (1) it serves as a binding agent binding together the conductive porous carbon particles which ensure the majority of the ion sorption capacity, although the porous polymer binding agent residue may contribute to the porosity of the electrode material to a certain extent; (2) the porosity created within the polymer binding agent by the thermal treatment will allow ions which contact the electrode, to enter and be sorbed in the porous system of the carbonlike-material formed from the polymer binding agent, as well as in the porous system of the porous carbon particles, which together with the polymer binder agent forms the active material for the electrode or at least part thereof. The method of this invention therefore permits producing an electrode with an enhanced ion sorption capacity, because of the enhanced accessibility of the carbon porous structure provided by the porous structure that has developed in the polymer binding agent; (3) the polymer binding agent residue which remains after the thermal treatment, provides an electrically conductive binder which not only binds together the conductive carbon particles, but which also electrically connects the conductive carbon particles to the carrier material, often a current density distributor or current collector of the electrode.

The method of this invention is thus capable of providing a capacitive deionisation electrode that is electrically conductive over the entire thickness of the electrode. Because of its electric conductivity, the polymer binding agent residue after thermal treatment contributes to the ionic and electric conductivity of the electrode and contributes to enhancing the ionic and electric conductivity of the porous carbon powder forming the active material of the electrode. Because the polymer binding agent is converted into a porous medium both by the phase inversion and the thermal treatment, ion sorption may be ensured both by the conductive carbon powder and the polymer binding agent residue ever the entire thickness of the electrode.

The present invention therewith differs from prior art methods, where usually the function of binding agent and agent for enhancing ionic conductivity were performed by separate compounds, an electrically conductive but non-adhesive additive (e.g. carbon black) and an adhesive and ion conductive but electrical insulating binder.

The porous carbonlike-phase formed from the polymer binding agent has further been found capable of adhesively binding the active layer comprising conductive porous carbon particles and the binding agent, to an underlying current collector or carrier, if present. The binding agent further ensures that the conductive porous carbon particles are electrically connected to the underlying electron conductor carrier or current collector by an in-situ formed electron-conducting carbonlike-phase.

The present invention thus provides a method with which in-situ a porous electrically conductive carbonlike-phase can be formed, which adhesively binds the porous carbon particles of the active electrode material to each other and to an underlying current collector. The method of this invention thus shows the advantage that an electrode can be obtained which not only is conductive over its entire thickness, but which because of its porosity which extends over the entire thickness of the electrode's active material, is accessible and available for ion sorption over the entire thickness of the electrode's active material.

Previous approaches to the production of cost-effective capacitive deionisation electrodes were obliged to include the addition of electrically conductive additives (e.g. carbon black) and/or the use of binder materials which are composed of ion exchange resin polymers or in general polymers which contain ion exchanging functional groups. The need to incorporate additional conductive carbon black in order to increase the electric conductivity of the carbon layer can be obviated with the present invention. Prior art conductive additives did not contribute to binding the active material particles together and hence did not contribute to the structural strength of the electrode. Ion exchange resin based binders are usually electrically insulating materials, and the charge sign of their ionic charges cannot be changed during operation of the system. Hence, electrodes composed with a single type of ion exchange resin binder only achieve a benefit to the desalination rate if they are polarized in one direction only. Such unipolar operation is however detrimental to the lifetime of capacitive deionisation electrodes. Alternatively, both anionic and cationic resin could be used as binder in one electrode. Given that the amount of binder that can be successfully used in an electrode without compromising its electrical conductivity is limited, only a rather limited benefit to salt adsorption rate could be achieved by such a binder composition.

In a preferred embodiment, the thermal treatment comprises a first step which is carried out for a period of time of at least 20 minutes, preferably at least 30 minutes, more preferably at least 60 minutes, in particular at least 120 minutes, and a period of time of maximum 240 minutes. A minimum duration of the thermal treatment, of 20 minutes is necessary to permit formation of a sufficiently large conductive network. However, continuing the thermal treatment for more than 240 minutes does generally not improve the specific adsorption capacity of the electrode and may even go at the expense of the ion adsorption capacity and the adsorption rate.

In a preferred embodiment of the method of this invention, the thermal treatment of the precursor electrode, containing the phase inverted polymer binding agent, is carried out in oxidative conditions, to ensure that the polymer binding agent, is at least partially cyclized and/or carbonized, to maximize maintenance of the amount of carbon based material in the thermally treated polymer binding agent and minimize the risk to conversion of the polymer binding agent into $CO_2$. In an example, where polyacrylonitrile is used as the polymer binding agent, cyclisation may proceed as follows, typically in a temperature region of 200-300° C., in the presence of oxygen or an oxygen containing gas

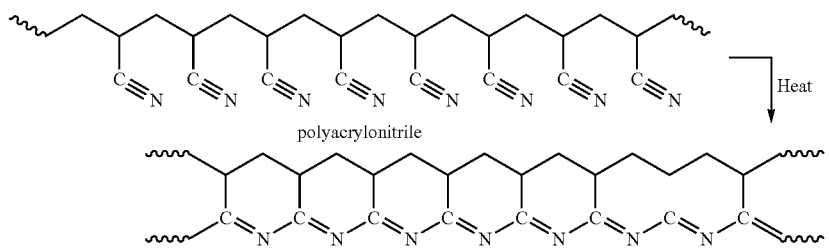

polyacrylonitrile

Further heating in inert atmosphere to a temperature of 400-600° C. may be desired and may, in the absence of oxygen or the lowest possible concentration of oxygen, give rise to the formation of

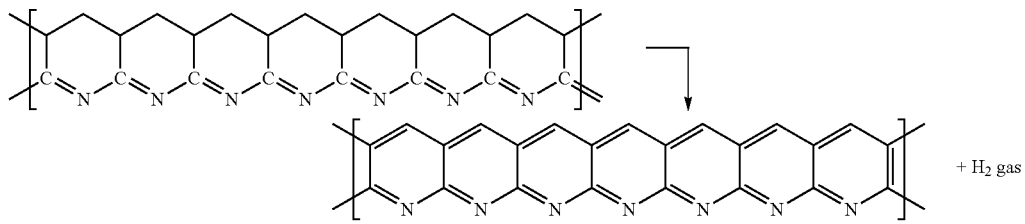

+ $H_2$ gas

In a further preferred embodiment the thermal treatment of the electrode precursor may be carried out differently, by subjecting the electrode precursor to a second thermal treatment which is preferably carried out at a temperature which is maximum 600° C. or maximum 500° C., preferably maximum 400° C., more preferably maximum 300° C., most preferably maximum 275° C., in particular maximum 250° C. In case the use of temperatures above 250° C. is desired, heating is preferably carried out in the absence of oxygen or in an atmosphere in which the amount of oxygen has been reduced to the best possible minimum, to minimize the risk to conversion of the polymer material into $CO_2$. In general, heating temperatures above 600° C. will not be preferred as this risks to adversely affect the active surface area, of the porous conductive carbon, which should ensure sorption of the ions from the solution to be treated. Heating above a temperature of 600° C. also risks to adversely affect the composition and structure of the material formed by the thermal treatment of the polymer binding agent. In the example above, further heating could result in the removal of at least part of the N moieties present.

The duration of the thermal treatment step may vary within some limits, but is preferably continued for a period of time of at least 20 minutes, preferably at least 30 minutes, more preferably at least 60 minutes, in particular at least 120 minutes, and a period of time of maximum 240 minutes.

In a preferred embodiment, the thermal treatment contains a first and a second step. The first step comprises heating of the cast layer up to a maximum temperature of 250° C. in oxidative conditions to achieve that the phase inverted polymer binding agent is at least partially cyclized, dehydrogenated, oxidative stabilized and/or carbonized and minimize the risk to conversion of the polymer into $CO_2$. The first thermal treatment step may be carried out at a temperature of maximum 300° C., preferably maximum 275° C., in particular maximum 250° C. In general, the first thermal treatment step will be carried out at a temperature of at least 50° C., preferably at least 100° C., more preferably at least 150° C., in particular at least 175° C. The duration of such a first heating step will usually be as described above. The second step comprises heating of the cast layer up to a temperature of 400-600° C. as described above. In general the duration of this second treatment step will be shorter than the duration of the first step, to minimize the risk to burning or oxidation of the material to an unwanted extent. Therefore, the of the second thermal treatment step may preferably be continued for a period of time of at least 1 or 2 minutes, preferably at least 5 minutes, more preferably at least 10 minutes, and will in general be maximum 60 minutes, preferably maximum 45 or 30 minutes.

In advance of the thermal treatment, preferably the cast layer is subjected to degassing in order to optimally control porosity development induced by the thermal treatment.

To ensure form stability of the cast layer, to therewith ascertain that the polymer binding agent compound in the course of the thermal treatment functions as a binding agent for the porous conductive carbon particles of the electrode, the polymer binding agent is selected from the group of polymers capable of being converted into a porous material when subjected to phase inversion, and having a degradation temperature that is lower than the melting temperature of the polymer. Such polymers are well known to the skilled person In a first preferred embodiment, the polymer binding agent includes a polymer selected from the group of nitrile polymers. Nitrile polymers are a typical example of polymers capable of undergoing cyclisation upon heating at least partly in the presence of oxygen as described above, thereby converting the nitrile groups into unsaturated polycyclic compounds, forming an electrically conductive network. The cyclisation may involve a partial dehydrogenation of the polyacrylonitrile. Herein, a particularly preferred binder material is polyacrylonitrile (PAN). The ionic conductivity of the thermally treated PAN is at least partially due to its electrical conductivity: the mechanism of additional ion transport takes place via surface conduction through the electrical double layer which forms at the surface of the pores of the electrically charged thermally treated PAN. The thermal treatment, also renders the PAN binder porous, ensuring a large area of electrically charged pores that form percolating, ionically conductive bridges between the active material particles, much beyond what can be achieved by the use of electrically conductive additives (eg carbon black). This results in cheaply produced electrodes capable of achieving much faster ion transport, particularly at low salt, concentration conditions.

Other polymers suitable for use as a binding agent in the present invention include one or more polymers selected from the group of polyacetates, in particular poly(vinylacetate); cellulose compounds, in particular carboxymethyl cellulose.

According to another preferred embodiment, the polymer binding agent is a carbonisable polymer. A carbonizable polymer is a generic term used to describe any synthetic polymer material capable of forming carbon material, in particular porous carbon material, preferably activated carbon. In a preferred embodiment "carbonizable polymer" means a polymer which, upon thermal treatment according to the invention, forms a carbon-based or hydrocarbon based residue, the weight of which is at least 20% of the weight of the polymer being employed. "Carbonization" refers to the process of heating the polymer binding agent to an elevated temperature as described in the claims, for an effective amount of time to sufficiently carbonize the mixture to produce a porous carbonized material, that is electrically conductive and binds together the particles of the active carbon powder which forms part of the active material of the capacitive deionization electrode. Preferably, the carbonizing atmosphere contains oxygen, because the presence of oxygen will ensure the formation of functional groups on the carbonized body. Examples of synthetic carbonizable polymers suitable for use with this invention include poly(acrylic acid), poly(vinyl acetate); cellulose acetate, poly(ethyleneimine), poly(ethylene-co-vinylacetate), poly (lactic acid), mixtures thereof, and the like.

Within the scope of this invention, a polymer that may be cyclized is a generic term used to describe any synthetic polymer material comprising functional groups or segments capable of undergoing cyclisation.

The amounts and types of such carbonizable polymers or polymers that may undergo cyclisation to be incorporated in the slurry as a precursor material, can be selected to provide a desired pore volume, as well as pore size distribution resulting from the decomposition of the precursor polymer materials during carbonization.

The amount of polymer binding agent with respect to the activated porous carbon is not critical to the invention and may vary within wide ranges. The amount of polymer binding agent with respect to the activated porous carbon may in practice vary from 2.0-50.0 wt. %. When the ratio of the polymer binding agent with respect to the amount of porous carbon sinks below 2.0 wt. % insufficient binding between the porous carbon particles risks to occur. Ratio's above 50.0 wt. % risk to lead to materials with a too low content of active conductive carbon powder.

To carry out the method of this invention, a single solvent or a mixture of solvents may be used for dissolving the polymer binding agent. A variation in solvent mixture may give rise to different film morphologies and hence in electrode performance. Suitable solvents for carrying out aspects of the invention are advantageously aprotic solvents and are advantageously one or more of dimethylformamide (DMF), dimethylsulfoxide (DMSO), dimethylacetate (DMAc), N-methyl-2-pyrrolidone (NMP), N-ethyl-2-pyrrolidone (NEP), methyletherketone, dioxane, triethylphosphate, aceton, diethylenetriamine or a mixture of two or more hereof since these allow for being easily removed from a electrode forming suspension by phase separation.

Additional suitable solvents, possibly for use in a solvent: co-solvent. system in the electrode forming solution are: tetrahydrofuran (THF), tetramethyl urea (TMU), N,N-dimethylpropylene urea (DMPU), trimethyl phosphate (TMP), triethyl phosphate (TEP), tri-n-butyl phosphate (TBP), tricresyl phosphate (TCP), acetone, aniline. Ketones, such as methyl ethyl ketone (MEK) can be suitable solvents as well.

Chlorinated hydrocarbons, such as methylene chloride, dichloromethane, and trichloroethylene can be suitable solvents as well. Tamisolve® N×G solvent (Taminco BVBA, Belgium) can be suitable as well. Other possibly suitable solvents, which can be used in combination with the above indicated solvents, in particular dissolving polymer compounds are aromatic fluids, such as Solvesso™ (Exxon Mobil Corp.) solvents, and chloroform. It shall be clear to the skilled person that mixtures of two or more of the afore mentioned solvents may be used as well.

The amount of solvent used to produce the slurry may vary within wide ranges, and will generally be selected by the skilled person in such a way that a desired viscosity may be attained. Within the scope of the present invention, the slurry preferably has a viscosity of between 0.5 and 500 Pa.s, more preferably between 10 and 400 Pa.s, The viscosity of the slurry is preferably sufficiently high to minimize the risk to running of the slurry when cast into a layer, and sufficiently low to permit an easy application of the slurry. Varying the viscosity can for example be achieved by addition of a dilutant (e.g. acetone, alcohols, and other solvents etc.) which is evaporated later on in the process. It has been observed that the slurry of the present invention may show thixotropic properties, wherein the viscosity varies depending on shear forces to which the slurry is subjected.

The porous, particulate, conductive carbon powder used in the method of this invention may vary in nature, and is preferably selected from the group of activated carbon, carbon black, ordered mesocarbon, carbon aerogel, carbide derived carbon, carbon nanotubes and graphene, or a mixture of two or more of the afore-mentioned materials, preferably activated carbon. Activated carbon material is often derived from natural sources such as coconut shells, wood, coal, starch, or synthetic sources such as resins or other organic precursors. They combine a high specific surface area of 1000-3500 m2/g, and a low cost and are therefore attractive for widespread commercial application. Ordered mesocarbon materials often have a specific surface area of between 950 and 1594 m2g and an average pore size between 3.3 and 4.0 nm. Carbon aerogels combine a moderate specific surface area of typically 400-1100 m2/g, but also up to 1700 m2/g with a high electrical conductivity (25-100 S/cm). Carbon blacks are usually dense carbon nanoparticles with a low specific surface area of typically below 120 m2/g, and because of their high electrical conductivity, they are a common conductive additive to film electrodes composed of porous carbons. With specific surface area is meant the BET surface area measured using N2 adsorption at liquid nitrogen temperature, As used herein, "activated carbon" is used as a generic term used to describe carbonaceous adsorbents with an extensively developed internal pore structure. Activated carbon can be produced by stabilizing carbon, if necessary, then activating the carbon, such as amorphous (non-graphitic) carbon, wherein amorphous (non-graphitic) carbon can be produced by carbonizing one or more carbonizable precursors, as mentioned above. While activated carbon generally is formed from amorphous (non-graphitic) carbon, activated carbon may also be formed from non-amorphous carbon, such as carbon nanotubes.

The weight ratio of the polymer binding agent to the conductive carbon powder may vary within some ranges, but should be selected such that it is sufficiently larger to provide, following thermal treatment, an electrically conductive network connecting a sufficient amount of particles of the activated carbon together and to the underlying carrier material, for example the current collector or current density distributor. On the other hand the weight ratio of the polymer binding agent to the conductive carbon powder should not be too large to minimise the risk to blocking of the porous network of the activated carbon particles which should be accessible to the ions to be adsorbed therein, in practice, in particular when using polyacrylonitrile as the polymer binding agent, the weight ratio of the polymer binding agent to the conductive carbon powder will usually vary from 70.0:30.0 to 90.0:10.0, preferably from 75.0:25.0 to 85.0:15.0.

The production of a layer or film for a solid porous electrode can be accomplished in many ways known to the skilled person, for example by layerwise spreading the slurry of polymer binding agent and conductive carbon powder, for example using roll coating, blading, etc., prior to the thermal treatment. In a preferred embodiment, the slurry will be spread on one side of a carrier or support, often the current collector. A slurry thickness of 0.1 mm to 1 mm will generally provide an electrode with a desired thickness and performance. The thickness of the cast layer after having been subjected to the thermal treatment may vary within wide ranges, but is preferably maximum 500 micron, preferably maximum 250 micron, more preferably maximum 100 micron. The inventors have observed that the risk to adversely affecting the de-ionisation capacity increases when the layer thickness raises above 500 micron and when it sinks below 100 micron. This method will usually be employed in the production of so-called flow-by electrodes, where water to be desalinated is flown through a space between the electrodes.

In another preferred embodiment, the slurry may be spread on both opposite sides of a carrier or support, often the current collector. This type of electrodes will often be employed as flow-through electrodes or flow-by electrodes, where the feed flows directly through the electrodes along the primary electric field direction. If so desired, flow-by electrodes may additionally comprise an ion exchange membrane layer.

According to another method, the slurry may be spread into the pores of a fiber cloth, for example a carbon fiber cloth, carbon foam, felt, paper, a conductive substrate (e.g. carbon paper or copper foil), or a non-conductive substrate, after which the thus coated substrate is subjected to a thermal treatment. A metal current collector, for example made of Ni, Cu and/or stainless steel, can be positioned between two layers of slurry impregnated fiber cloth. After the thermal treatment, the metal current collector is imbedded between the two cloths, and provides electric contact to both layers on either side.

The slurry may be cast on one or more faces of a current collector of the electrode.

Suitable materials for use as a current collector include a graphite sheet, a carbon foam, a felt material comprising conductive carbon fibers and reticulated vitreous carbon, which is a rigid, highly porous and permeable structure and has a controlled density of carbon per unit volume.

To introduce intra particle porosity into the cast slurry of porous carbon particles and polymer binding agent, in advance of the thermal treatment, the cast layer is subjected to a wet phase inversion. Wet phase inversion will cause the formation of a porous structure in the cast layer. The phase inversion process may be carried out and the solvent or solvents used to dissolve the polymer material may be removed. The electrode precursor obtained after the phase inversion is typically a porous material, and solvent may accumulate in the pores. This may be achieved by subjecting the electrode precursor thus obtained to washing with a liquid capable removing any remaining solvent, and the washed electrode precursor is left to dry. Thereafter, the dried precursor electrode is dried and is ready for the thermal treatment by e.g. evaporation of the solvent or immersion of the cast layer in a non-solvent for the polymer binding agent, in a mixture of two or more non-solvents for the polymer binding agent, a mixture of a non-solvent for the polymer binding agent and a solvent or one or more solvents for the solvent for the polymer binding agent. Besides solvent removal, this step will also cause porosity formation in the layer comprising the porous conductive carbon and polymer binding agent.

Within the scope of this invention a wide variety of non-solvents may be used to achieve wet phase inversion. A particularly preferred non-solvent is water or a mixture of water with one or more polar solvents, for example an alcohol, for example ethanol or methanol. According to another preferred embodiment, the cast layer may be contacted with water vapour, followed by contacting it with water. This procedure may be used in case a more open pore structure in the polymer binding material is envisaged.

The present invention also relates to a porous carbon electrode, comprising a porous active layer which contains particles of a porous conductive carbon powder, at least part of which are connected by a porous residue of a thermally treated polymer binding agent capable of undergoing carbonization or cyclisation. The porous conductive carbon powder, the polymer binding agent, and the thermal treatment are as described above.

The present invention also relates to an electrochemical cell containing at least one porous carbon electrode as described above.

The present invention further relates to a method for desalination of water, wherein an aqueous solution containing one or more salts is subjected to desalination in an electrochemical cell as described above.

The present invention additionally relates to a method for capacitive de-ionization of water, wherein an aqueous solution containing one or more salts is subjected to capacitive de-ionization in an electrochemical cell as described above.

The capacitive de-ionization performance of a carbon electrode is related to many aspects of the conductive carbon material, in particular the active surface area, the total pore volume, the pore size, and the pore connectivity. Other important properties include electric conductivity, electrochemical stability, and cost. The prevalent pore shape strongly depends on the carbon material, the synthesis conditions, and the post-synthesis procedure. Whereas larger pores provide better transport pathways, they also decrease the total specific surface area. A smaller pore size and a larger total number of small pores translates to a larger specific surface area, but transport pathways may be slower, because of complicated path shapes combined with small pore diameters. It will therefore be clear that it is particularly important yet difficult to accomplish to combine a high specific surface area with a high ion mobility.

Capacitive de-ionization generally uses pairs of oppositely placed porous carbon electrodes which store ions upon applying an electrical voltage difference, as is shown in FIG. 1. Devices for capacitive de-ionization usually employ a design with two porous carbon film electrodes, placed parallel to one another in such a way that a small planar gap is left in between the electrodes through which water can flow along the electrodes, which can be constructed either as freestanding thin films, or can be coated directly onto a flexible current collector such as graphite foil. The electrodes can be used in pairs of two electrodes, or in a stack of multiple pairs. The open channel between the electrodes, through which the water flows, can be an open channel, then typically at least 1 mm in thickness, or can be constructed from a spacer material, being a porous thin layer, of thickness typically between 100 and 300 micron.

The electrodes described above can be assembled in stacks of multiple pairs. When flowing water through the open channel between the two electrodes, the ions contained in the water are immobilized in the pores inside the carbon material, by the formation of electrical double layers inside the intra-particle pores. After some time, the accessible intra-particle pore volume is saturated with electro-sorbed ions and the storage capacity is reached. In order to regenerate the carbon electrodes, the ions are released from the electrode by reducing or reversing the cell voltage. In this way, a small stream enriched in ions is produced and the electrodes regain their initial ion uptake capacity. Ideally, without the presence of chemical reactions, this process is purely physical in nature and potentially enables CDI devices to have a long service life and low maintenance.

The open channel between the electrodes, through which the water flows, can be an open channel of typically at least 1 mm in thickness, or it may comprise a porous spacer material, of a thickness typically between 100 and 300 lm. The geometry is normally not such that a purely one-dimensional flow pattern arises, but instead water flows from one edge of a square channel to an exit point at the opposite corner, or from a hole in the center of a square cell radially out, Devices for capacitive de-ionization may also employ a design wherein the solution to be treated is forced to flow through the material of the electrode, i.e. the solution to be treated is supplied to one side of the electro e and is forced to flow through the material of the electrode.

The water or any other solution that is subjected to capacitive de-ionization can have very different compositions—ranging from analytical grade water with specified amounts of ions, to the complex compositions of brackish natural water or industrial process or waste water. Real water, for example diluted sea water, tap water, ground water, waste or process water from agriculture or industrial sources, will usually contain many different ions, monovalent as well as divalent, and with some ions being amphoteric (i.e., their charge dependent on pH, such as $HCO_{3-}$ or $HPO^2{}_4$). It will also contain colloidal matter, such as humic acids. Water may also contain only a single salt solution, such as NaCl or KCl. The method of this invention may for example be employed for the production of water with a dedicated ion composition, or for the production of water from which dedicated ions are removed, for example for use in dedicated human diets.

If so desired an ion-exchange membrane can be placed in front of one or more of the electrodes. With ion exchange membranes placed in front of the electrodes, ions expelled from the micropores of the electrode are blocked and immobilized by the membrane and will end up in the intra-particle pore space within the electrode and accumulate there. This accumulation of ions will lead to an accumulation of counter-ions in the macro-pores of the electrode as well. Thus, not only are counter-ions adsorbed in the electrical double layer in the micro-pores, but an additional part is stored in the macro-pores as well, where the salt concentration will ultimately be higher than in the spacer channel.

Due to the fact that the particles of the porous material, in particular the carbon particulate material, are bound together by a network of a porous, electrically conductive binding agent, an additional porous network is created in the electrode material. The porous system of this additional porous network may function as an adsorption member for adsorbing any ions to be removed from a solution to be subjected to a desalination treatment, or any other ions if a different process is in a different application is envisaged. This facilitates access of these ions to the pore system of the carbon powder, and results therein that the ion adsorption rate of the electrode may be enhanced. Because of the presence of the additional pore system, also the adsorption capacity of the electrode may be enhanced. As a result of the enhanced adsorption rate and/or adsorption capacity, the electrode surface area needed to achieve a certain desalination or ion-removal capacity, may be reduced. Or else, when maintaining the a same electrode surface area, the desalination or ion-removal capacity, may be enhanced. Because of the presence of the additional porous network, a smaller amount of carbon particulate material may be used, while still a sufficient porosity in the electrode material may be maintained. This may positively affect the costs for producing such electrodes and improve the accessibility of desalination techniques. The invention is further illustrated in the examples below

EXAMPLE 1

Production of a Flow by Carbon Based Electrode for Use in Capacitive De-Ionisation A suspension was produced which should form a precursor of the active layer, by preparing a polymer solution containing 5 wt % of Dralon® X polyacrylonitril (PAN) polymer of Dralon company—Dormagen/Lingen Germany, in 95 wt % Dimethylacetamide (DMAc) solvent. The suspension was prepared under continuous cooling to a maximum temperature of 10° C., until a clear solution is obtained.

To this solution an amount of YP50F active carbon powder from the Kurara company, equal to 9 times the total dissolved amount of PAN polymer present, was gradually added using a high-energy mixer under continuous cooling. When the complete amount of carbon powder had been added the desired suspension was obtained. The suspension contained 90 wt. % of YP50F carbon powder and 10 wt. % of PAN X100 polymer with DENTAc as the solvent, The global composition of the precursor-layer suspension is as follows:

3.45 wt % of PAN X100
65.52 wt % of DMAc
31.03 wt % of YP50F activated carbon powder This suspension is subsequently degassed by using a vacuum pump under continuous stirring at low temperature (10° C.). As a result a suspension with a viscosity of 200 Pa.s at 20° C. is obtained containing any air bubbles anymore.

This degassed precursor-layer suspension is then coated horizontally by a doctor knife coating technique onto the graphite support (500 μm) which is completely flat-streched, with a wet thickness of about 500 μm.

For obtaining the desired porous structure of the active layer a phase-inversion process was applied upon solidifying the electrode precursor layer from the casting suspension. Thereto the graphite support coated with the coating suspension were immersed together into a water non-solvent bath. By this process the solvent contained inside the coated layer was extracted liquid/liquid extraction by the water of the precipitation bath. After 15 minutes residence in the coagulation/precipitation bath the coated graphite support is put into a hot water bath (70° C.) for another 45 minutes for extracting the solvent remainders completely and to solidify the precursor-layer of the active layer completely.

A typical property for such layers obtained by this phase-inversion process by water coagulation is that they are substantially porous (50-75 volume percent), next to the porosity of the sorbent carbon powder material suspended in the polymer solution itself.

Subsequently the water-filled, and highly-porous active layer precursor-layer-onto-graphite-support, is dried for 24 hours into an oven at 80° C. to remove water from the thus formed precursor layer. The thickness of the precursor-layer of the active layer onto graphite support is about 200 μm and is now ready for being subjected to a thermal treatment.

The thermal treatment was carried out by eating the graphite support coated with the precursor-layer active layer in an oven, in air, from room temperature (without any external pressure onto the layer). The temperature of the hot-air oven was gradually raised from room temperature to 230° C. with a heating rate of 100° C. per hour. Once the temperature of the oven reached 230° C., this temperature was maintained for 1 hour. Care was taken that the temperature did not raise above 235° C. Then the oven was cooled to room temperature.

The residual weight of the active layer after this thermal treatment was at least 85% of the original weight and the layer thickness was increased by 5 to 10%. The active layer had a thickness of 150 μm.

The specific adsorption capacity of the electrode (SAC), expressed as g of salt/m$^2$ was 1.4. The specific adsorption rate when 50% of the adsorption capacity of the electrode (ASAR 50) was reached was 2.6 mg salt/m$^2$ electrode/s, whereas the specific adsorption rate when 90% of the adsorption capacity (ASAR 90) was reached was 2.5 mg salt/m$^2$ electrode/s.

EXAMPLE 2 AND 3

Example 1 was repeated, now with a suspension containing respectively 80 wt. % and 70 wt. % of YP50F carbon powder, and 20 wt. % and 30 wt. % of PAN X100 polymer with DMAc as the solvent.

The active layer had a thickness of 150 μm.

The specific adsorption capacity of the electrode (SAC), expressed as g of salt/m$^2$ of electrode was 0.9. The specific adsorption rate when 50% of the adsorption capacity of the electrode (ASAR 50) was reached was 4.8, respectively 2.5 mg salt/m$^2$ electrode/s, whereas the specific adsorption rate when 90% of the adsorption capacity (ASAR 90) was reached was 4.2, respectively 2.5 mg salt/m$^2$ electrode/s.

The results are summarized in table 1.

EXAMPLE 4 AND 5

Example 2 and3 were repeated, now with a suspension containing respectively 80 wt. % and 70 wt. % of YP50F carbon powder, and 20 wt. % and 30 wt. % of PAN X100 polymer with DMAc as the solvent, and casting an active layer with a thickness of 500 μm.

The specific adsorption capacity of the electrode (SAC), expressed as g of salt/m$^2$ of electrode was 3.7, respectively 2.1. The specific adsorption rate when 50% of the adsorption capacity of the electrode (ASAR 50) was reached was 4.6, respectively 3.1 mg salt/m$^2$ electrode/s, whereas the specific adsorption rate when 90% of the adsorption capacity (ASAR 90) was reached was 3.8, respectively 2.4 mg salt/m$^2$ electrode/s.

The results are summarized in table 1.

Comparative Experiment A.

Example 1 was repeated, now with a suspension containing 90 wt. % of YP50F carbon powder and 10 wt. % of polyvinylidene fluoride (PVDF) polymer with DMAc as the solvent.

The active layer had a thickness of 150 μm. This electrode was not thermally treated.

The specific adsorption capacity of the electrode (SAC), expressed as g of salt/m$^2$ was 2.0. The specific adsorption rate when 50% of the adsorption capacity of the electrode (ASAR 50) was reached was 3.1 mg salt/m$^2$ electrode/s, whereas the specific adsorption rate when 90% of the adsorption capacity (ASAR 90) was reached was 2.9 mg salt/m'electrode/s. The results are summarized in table 1.

EXAMPLE 6-11

Example 2 was repeated, with varying residence time in the oven, after it had reached a temperature of 230° C.

The results are summarised in table 2 below.

TABLE 2

| Example nr. | Time in oven at 230° C. Hours | Specific Adsorption Capacity (SAC) g salt/m$^2$ electrode | Specific Adsorption rate at 50% of adsorption capacity (ASAR 50) mg salt/m$^2$ electrode/s | Specific Adsorption rate at 90% of adsorption capacity (ASAR 90) mg salt/m$^2$ electrode/s |
|---|---|---|---|---|
| Example 6 | 0 | 1.04 | 3.2 | 2.8 |
| Example 7 | 0.25 | 0.94 | 2.5 | 2.2 |
| Example 8 | 0.5 | 1.14 | 3.7 | 3.3 |
| Example 9 | 1 | 0.87 | 4.8 | 4.2 |
| Example 10 | 4 | 0.87 | 2.0 | 2.1 |
| Example 11 | 16 | 0.54 | 1.7 | 1.7 |

EXAMPLE 12-13

Example 3 was repeated, with varying residence ti the oven, after it had reached a temperature of 230° C.

The results are summarised in table 3 below.

TABLE 3

| Time in oven at 230° C. Hours | Specific Adsorption Capacity (SAC) g salt/m$^2$ | Specific Adsorption rate at 50% of adsorption capacity (ASAR 50) mg salt/m$^2$electrode/s | Specific Adsorption rate at 90% of adsorption capacity (ASAR 90) mg salt/m$^2$electrode/s |
|---|---|---|---|
| 1 | 3.67 | 4.6 | 3.8 |
| 1.5 | 2.69 | 3.7 | 3.1 |

EXAMPLE 14

Production of a Full-Carbon Flow-Through Capacitive De-Ionisation Electrode

The process for the production of a precursor-layer for a full carbon flow-through type of capacitive de-ionization electrode, in particular the used support and the process used, differ somewhat from that of example 1.

A sheet of a graphite non-woven material (graphite felt) was used as a support for the layer of active material of the electrode, and as current collector. The material of which the graphite felt was made was selected such that it showed good compatibility with the capacitive de-ionization process, in particular the solvent used, the temperature range and current density at which the capacitive de-ionization process was carried out, and a good electron conductivity. Its total porosity was between 10 and 95% and its pore size between 10 and 1000 μm. The total thickness was between 0.25 and 10 mm.

In particular, a graphite felt was used of Baofeng Jinshi New Material Company, Longxing Road nr.10, Baofeng County, Henan Province (China) with a thickness of 3.15 mm with a total porosity of 92%, and an average pore diameter of 2 μm.

The suspension produced in example 1 was degassed and was used for making the precursor of the active layer of the flow through electrode inside the felt. It contained 90 wt % of YP50F carbon powder of the Kuraray company and 10 wt % of polyacrylonitrile (PAN) X100 polymer with DMAc as the solvent. The graphite felt was impregnated with the degassed precursor-layer suspension by bringing the graphite felt in a vertical position, flat-stretching it and using a vertical two-side, simultaneous coating machine for impregnating the graphite felt with the suspension. Use was made of a ribbon of graphite felt, 17 cm wide and 100 cm long. During the impregnation process the felt was transported between the two slot coating heads with a velocity of 0.144 m/min. A total volume of 69.4 cm$^3$/min of slurry had been applied.

For obtaining the desired porous structure of the active layer inside the graphite felt, a wet phase-inversion process was applied upon solidifying the precursor layer for the active layer of the electrode inside the felt. Thereto, the graphite support was immersed with the suspension into a water non-solvent bath to perform the wet phase-inversion of the PAN polymer by coagulation. Phase inversion by the water caused the solvent contained inside the felt to be extracted by liquid/liquid extraction. After 15 minutes residence in the coagulation/precipitation bath the impregnated graphite support was put into a hot water bath (70° C.) for another 45 minutes to achieve complete extraction of the solvent remainders and obtain solidification of the precursor-layer of the active layer inside the graphite felt. Thereafter, the water-filled, and highly-porous active layer precursor-layer inside the graphite felt, was dried for 24 hours into an oven 80"C. The thickness of the so-obtained precursor for the all carbon flow-through type of electrode was 3.5 mm.

The thus obtained precursor was then put into an oven with air atmosphere at room temperature, and the oven temperature was gradually raised from room temperature to 230° C. with a rate of 100° C. per hour. Once the temperature of the oven reached 230° C. it was maintained at that temperature for 8 hours, and the temperature was controlled in such a way that it did not rise above 235° C. Then, the oven was cooled down to room temperature.

The residual weight of the active layer after the thermal treatment was 85% of the original weight. The final thickness of the finished flow-through electrode was 3.5 mm.

TABLE 1

|  |  | Avg electrode thickness | SAC | ASAR50 | ASAR90 | SAC | ASAR50 | ASAR90 |
|---|---|---|---|---|---|---|---|---|
|  |  |  |  | Per g electrode | | | Per $m^2$ electrode | |
|  |  | mm | g/g | mg/g/min | mg/g/min | g/$m^2$ | mg/$m^2$/s | mg/$m^2$/s |
| Example 1 | PAN 90/10 150 μm | 0.167 | 13.1 | 1.3 | 1.2 | 1.4 | 2.6 | 2.5 |
| Example 2 | PAN 80/20 150 μm | 0.145 | 11.9 | 3.6 | 3.1 | 0.9 | 4.8 | 4.2 |
| Example 4 | PAN 80/20 500 μm | 0.511 | 11.7 | 0.8 | 0.6 | 3.7 | 4.6 | 3.8 |
| Example 3 | PAN 70/30 150 μm | 0.149 | 8.2 | 1.3 | 1.3 | 0.9 | 2.5 | 2.5 |
| Example 5 | PAN 70/30 500 μm | 0.451 | 8.8 | 0.7 | 0.5 | 2.1 | 3.1 | 2.4 |
| comparative experiment A | PVDF 90/10 150 μm | 0.160 | 12.5 | 1.0 | 1.0 | 2.0 | 3.1 | 2.9 |

ASAR 50 = Specific Adsorption rate at 50% of adsorption capacity (mg salt/$m^2$ electrode/s)
ASAR 90 = Specific Adsorption rate at 90% of adsorption capacity (mg salt/$m^2$ electrode/s)
SAC = Specific Adsorption Capacity (g salt/$m^2$)

What is claimed is:

1. A method for producing a porous carbon electrode, comprising:
    preparing a slurry by mixing a porous, particulate, conductive carbon powder with a solution of a polymer binding agent for the carbon powder in a solvent for the polymer binding agent;
    forming a precursor electrode by casting the slurry as a layer and subjecting a cast layer to a wet phase inversion to create porosity in the cast layer; and
    subjecting said precursor electrode to a thermal treatment by heating the precursor electrode to a temperature with the purpose of converting the polymer binding agent into a conductive binding agent binding said porous, particulate, conductive carbon powder together,
    wherein the polymer binding agent is a polymer material having a degradation temperature which is lower than the melting temperature.

2. A method according to claim 1, wherein the thermal treatment comprises a first step of heating the precursor electrode in the presence of an oxidizing agent to a temperature which is equal to or lower than the melting temperature of the polymer binding agent.

3. A method according to claim 2, wherein the thermal treatment comprises a first thermal treatment step which is carried out at a temperature of between 50° C. and 300° C.

4. The method of claim 2, wherein the thermal treatment of the precursor electrode is carried out in the presence of an oxygen containing gas.

5. A method according to claim 2, wherein the thermal treatment of the precursor electrode comprises a second thermal treatment step of heating the precursor electrode in an inert atmosphere to a temperature of between 250° C. and 600° C., wherein the second step is carried out after the first thermal treatment step.

6. A method according to claim 3, wherein the first thermal treatment step is carried out for a period of time of between 20 minutes and 240 minutes.

7. A method according to claim 1, wherein the polymer binding agent is selected from the group consisting of nitrile polymers.

8. A method according to claim 1, wherein the polymer binding agent comprises one or more polymers selected from the group consisting of polyacetates and cellulose compounds.

9. A method according to claim 1, wherein the weight ratio of the polymer binding agent to the conductive carbon powder varies from 70.0: 30.0 to 90.0:10.0.

10. A method according to claim 1, wherein the solvent for the polymer material is selected from the group consisting of N,N-dimethylformamide (DMF), formamide, dimethylsulphoxide (DMSO), N,N-dimethylacetamide (DMAC), acetonitrile, acetamide, trichloroethylene, chloroform, dichloromethane, N-methyl-pyrrolidinone (NMP), N-ethyl-pyrrolidinone (NEP), methyletherketone, dioxane, triethylphosphate, aceton, diethylenetriamine and mixtures of two or more hereof.

11. A method according to claim 10, wherein the solvent comprises a co-solvent selected from the group consisting of tetrahydrofuran (THF), tetramethyl urea (TMU), N,N-dimethylpropylene urea (DMPU), trimethyl phosphate (TMP), triethyl phosphate (TEP), tri-n-butyl phosphate (TBP), tricresyl phosphate (TCP), acetone, aniline ; a ketone; a chlorinated hydrocarbon; aromatic fluids and chloroform and a mixture of two or more of the afore-mentioned co-solvents.

12. A method according to claim 1, wherein the cast layer of the slurry after having been subjected to the thermal treatment has a thickness of 500 micron or less.

13. A method according to claim 1, wherein the slurry is subjected to degassing before being subjected to the thermal treatment.

14. A method according to claim 1, wherein the slurry is cast on at least one side of an electrically conductive carrier.

15. A method according to claim 1, wherein the porous carbon electrode comprises a current collector and the slurry is applied to both opposite sides of the current collector.

16. A method according to claim 1, wherein the slurry is applied to an electrically conductive carrier using impregnation.

17. A method according to claim 16, wherein said electrically conductive carrier is made of a material or a combination of materials selected from the group consisting of a sheet material and a felt material comprising conductive carbon fibers and reticulated vitreous carbon.

18. A method according to claim 17, wherein a current collector is positioned between two layers of a sheet material impregnated with the slurry.

19. A method according to claim 1, wherein the porous carbon powder has a BET surface area of at least 250 m2/g.

20. A porous carbon electrode, comprising a porous active layer which contains particles of a porous conductive carbon powder, wherein at least part of the particles are connected by a porous residue of a polymer binding agent that has been subjected to a thermal treatment according to claim 1.

21. An electrochemical cell containing at least one porous carbon electrode obtained with the method of claim 1.

22. A method for desalination of water, wherein an aqueous solution containing one or more salts is subjected to desalination in an electrochemical cell according to claim 21.

23. A method for capacitive de-ionization of water, wherein an aqueous solution containing one or more salts is subjected to capacitive de-ionization in an electrochemical cell according to claim 22.

* * * * *